May 29, 1923.
J. W. FLYNN
1,456,922
AUTOMOBILE LOCKING MECHANISM
Filed March 8, 1922
2 Sheets-Sheet 1
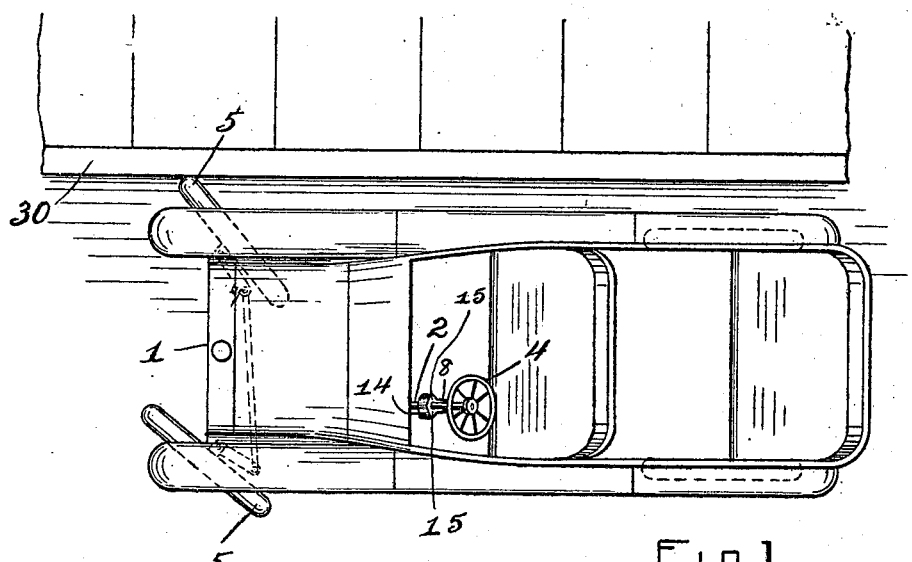
Fig.1.
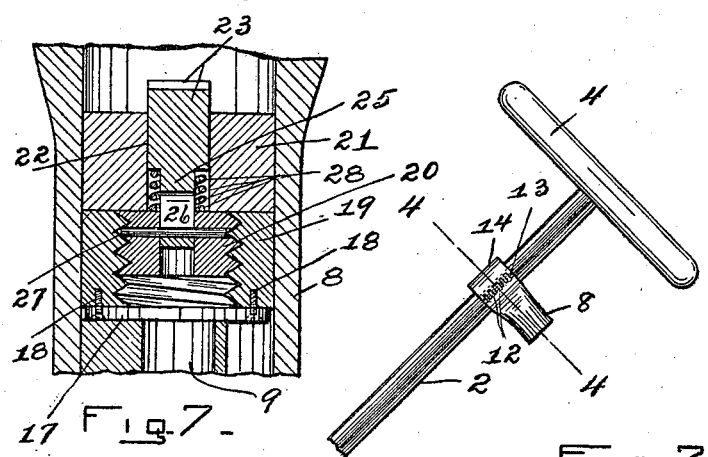
Fig.7.
Fig.2.
Inventor,
John W. Flynn,
By Frank C. Curtis
Attorney

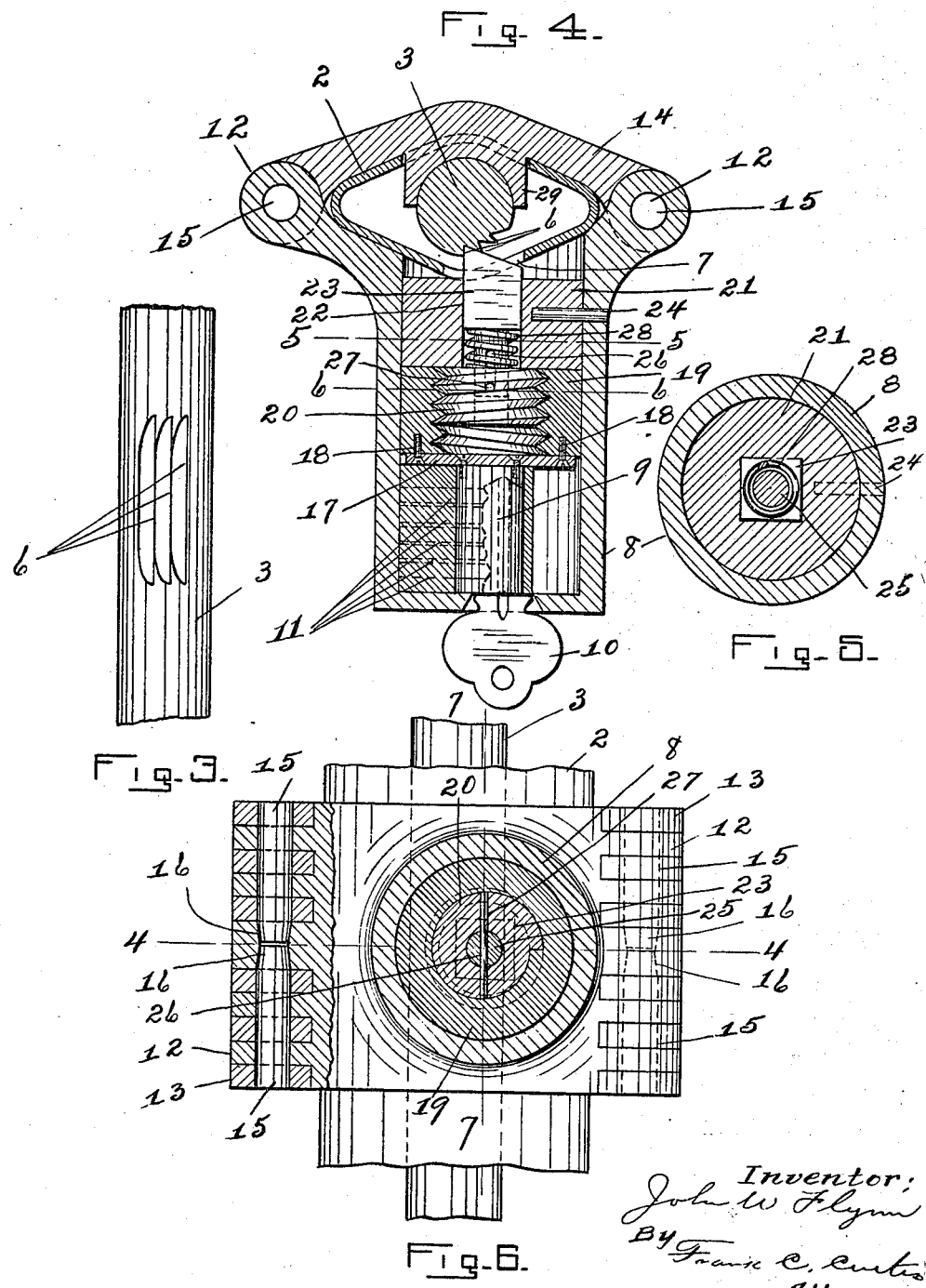

Patented May 29, 1923.

1,456,922

UNITED STATES PATENT OFFICE.

JOHN W. FLYNN, OF WATERFORD, NEW YORK, ASSIGNOR OF ONE-THIRD TO FREDERICK W. KAVANAUGH AND ONE-THIRD TO CHARLES H. KAVANAUGH, BOTH OF WATERFORD, NEW YORK.

AUTOMOBILE LOCKING MECHANISM.

Application filed March 8, 1922. Serial No. 542,122.

*To all whom it may concern:*

Be it known that I, JOHN W. FLYNN, a citizen of the United States, residing at Waterford, in the county of Saratoga and State of New York, have invented new and useful Improvements in Automobile Locking Mechanism, of which the following is a specification.

Reference may be had to the accompanying drawings, and the reference characters marked thereon, which form a part of this specification. Similar characters refer to similar parts in the several figures therein.

The principal object of the invention is to securely lock the front wheels of an automobile or the like in cramped or deflected position such that the vehicle cannot be operated in other than a curved path.

Other objects will appear in connection with the following description.

Fig. 1 of the drawings is a top plan view of an automobile parked against a sidewalk-curb with the front wheels locked by my improved mechanism in cramped or deflected position, such that the car cannot be operated except to move against or over said curb.

Fig. 2 is a view in side elevation of a broken-away portion of the steering-post, showing my improved locking mechanism mounted thereupon.

Fig. 3 is a view in side elevation of a broken-away portion of the steering-post having ratchet-teeth formed thereon.

Fig. 4 is a cross-section taken through the steering-post and locking mechanism, on the broken line 4—4 in Figs. 2 and 6.

Fig. 5 is a cross-section of the steering mechanism taken on the broken line 5—5 in Fig. 4.

Fig. 6 is a cross-section taken through the locking mechanism on the broken line 6—6 in Fig. 4.

Fig. 7 is a section taken through the axis of the barrel of the lock on the broken line 7—7 in Fig. 6.

Referring to the drawings wherein the invention is shown in preferred form, 1 is an automobile having a steering-post, 2, through which passes a rotatory steering-shaft, 3, operated by steering-wheel, 4, in the usual manner.

The steering-shaft, 3, controls the angular position of the front wheels, 5, of the vehicle by the usual connections not shown.

For the purposes of the present invention, it is sufficient to call attention to the fact that the front wheels can be cramped or deflected to the right by clockwise rotative movement of the steering-wheel, 4, and cramped or deflected to the left by reverse movement of the steering-wheel.

In carrying out my invention I mount upon or form upon the steering-shaft, 3, a number of ratchet-teeth, 6, opposite an opening, 7, formed in the steering-post, 2.

Opposite this ratchet-portion of the steering-shaft, 3, I clamp upon the steering-post, 2, a casing, 8, of a pin-lock having a rotatory barrel, 9, adapted to be rotatively moved by a key, 10, formed to fit the lock which has the usual tumblers, indicated by dotted lines, 11 in Fig. 4.

The lock-casing, 8, is formed with ears, 12, which interengage with similar ears, 13, on a clamp-plate, 14; the steering-post being embraced or clamped between said clamp-plate and the extension of the lock-casing; and the clamping members are secured in position by pintles, 15, tightly driven into registering apertures in the respective interengaging ears, 12 and 13.

The innermost of these apertures are tapered as shown at 16, in Fig. 6, whereby the inward movement of the pintles is limited and the pintles can be removed only with great difficulty. The lock is thus so secured upon the steering-post that it can only be removed by the use of proper tools and at the expense of considerable time.

Fixed upon the inner end of the rotatory lock-barrel, 9, is the usual disk, 17, upon which is fixedly mounted by means of screws, 18, a screw-member in the form of a nut, 19, which is thus adapted to rotate in unison with the barrel, 9, of the lock.

Fitting within the nut, 19, is a screw-member, 20, which is adapted to be moved toward and from the steering-shaft, 3, by rotative movement of the barrel, 9, of the lock in opposite directions.

Mounted within the lock-casing, 8, is a stationary slideway-block, 21, formed with a slideway-aperture, 22, alined with the opening, 7, in the steering-post, 2; and within the slideway thus formed in the slideway-block, a bolt, 23, is movable through the opening, 7, in the steering-post, 2, into and out of ratchetwise engagement with the ratchet-teeth, 6, on the steering-shaft, 3.

The bolt, 23, is connected with the screw-member, 20, by means of a shank, 25, on the bolt which fits within an axial aperture in the screw-member, 20, said shank being provided with a longitudinal slot, 26, which receives a cross-pin, 27, passing through said screw-member, 20, said slot providing for longitudinal lost motion between the members thus connected together.

A coil-spring, 28, is interposed between the bolt, 23, and the screw-member, 20, and tends to yieldingly hold the bolt in engagement with the steering-shaft, 3, when the lock is in locked position.

The teeth, 6, on the steering-shaft, 3, or the inner end of the bolt, 23, or both, are beveled to permit the shaft, 3, to be rotatively moved in one direction due to the yielding movement of the bolt, 23, while the shaft is positively locked against rotative movement in the opposite direction.

The coil-spring, 28, is normally under little or no compression so that the bolt, 23, moves inward and outward in accordance with the inward and outward movements of the screw-member, 20, but permits the bolt when in locked position to yield to the wedgewise pressure of the teeth, 6, when the steering-shaft, 3, is rotated in the proper direction.

The steering-shaft may be supported opposite its point of engagement with the bolt, 23, by means of a block, 29, projecting from the clamp-plate, 14, through a suitable opening in the steering-post, 2.

The operation of the device is as follows.

The operator of the automobile, desiring to park the same, stops near the curb, 30, and by means of the steering-wheel, 4, more or less cramps the front wheels, 5, toward the curb. He then locks the device by means of the key, 10, and can thereafter, either while within the car or outside the car, further cramp or deflect the front wheels in the same direction, but the wheels cannot be deflected in the opposite direction until the lock is unlocked by means of the key.

The operator of the automobile can thus leave the machine with the wheels deflected at any desired angle, and at such an angle that the vehicle can be operated only against or over the curb, 30, thus making it practically impossible for one to steal the car, because the car would simply travel in a circle, or if in a built-up section would travel over the sidewalk against the neighboring fence or building.

When the possesser of the key wishes to operate the car he has merely to unlock the pin-lock, thereby leaving the steering mechanism free for operation in the usual manner.

What I claim as new and desire to secure by Letters Patent is—

1. The combination with a rotatory steering-shaft of an automobile or the like; of a Yale-lock mounted upon a stationary support; a screw-threaded member in fixed relation to the rotatory barrel of said lock in engagement with a cooperating non-rotatory screw-threaded member; and a bolt carried by the latter screw-threaded member, said bolt being capable of ratchetwise engagement with the steering-shaft.

2. The combination with the steering-shaft of an automobile or the like; of a Yale-lock mounted upon a stationary support; a screw-threaded member in fixed relation to the rotatory barrel of said lock in engagement with a cooperating non-rotatory screw-threaded member; a bolt capable of ratchetwise engagement with the steering-shaft, said bolt and said second-mentioned screw-threaded member being connected together with provision for longitudinal lost-motion; and a spring interposed between said bolt and said second-mentioned screw-threaded member.

3. The combination with the steering-post and steering-shaft of an automobile or the like, said steering-post being provided with a lateral opening; of a Yale-lock having a casing mounted upon the steering-post and having a bolt movable through said lateral opening in the steering-post into and out of ratchetwise engagement with the steering-shaft; a screw-member in fixed relation to the rotatory barrel of said lock in engagement with a non-rotatory cooperating screw-member, and in connection with said bolt with provision for longitudinal lost-motion; and a spring interposed between said bolt and said second-mentioned screw-member.

In testimony whereof, I have hereunto set my hand this 17th day of February, 1922.

JOHN W. FLYNN.